United States Patent [19]
Christe

[11] 4,108,965
[45] Aug. 22, 1978

[54] $(NF_4)_2NiF_6$ HIGH ENERGY SOLID PROPELLANT OXIDIZER AND METHOD OF PRODUCING THE SAME

[75] Inventor: Karl O. Christe, Calabasas, Calif.

[73] Assignee: Rockwell International Corporation, El Segundo, Calif.

[21] Appl. No.: 732,623

[22] Filed: Oct. 15, 1976

[51] Int. Cl.$^2$ .............................................. C01G 53/00
[52] U.S. Cl. ................................... 423/351; 149/119; 423/472
[58] Field of Search ............... 149/19.3, 119; 423/138, 423/140, 143, 351, 472

[56] References Cited

U.S. PATENT DOCUMENTS 3,980,509   9/1976   Lubowitz et al. ............... 149/119 X
3,981,756   9/1976   Gotzmer ....................... 149/19.92 X

OTHER PUBLICATIONS

Christe et al., "Inorganic Halogen Oxidizer Research," Report R-9881, pp. 7-10, (Apr. 7, 1976).

Primary Examiner—Edward A. Miller
Attorney, Agent, or Firm—L. Lee Humphries; Robert M. Sperry

[57] ABSTRACT

The combination of the strongly oxidizing $NF_4^+$ cation with the strongly oxidizing $NiF_6^{--}$ anion in the form of the stable salt $(NF_4)_2NiF_6$ produces a powerful oxidizer, useful for solid propellant formulations and $NF_3-F_2$ gas generators. A process for its production is described.

4 Claims, No Drawings

$(NF_4)_2NiF_6$ HIGH ENERGY SOLID PROPELLANT OXIDIZER AND METHOD OF PRODUCING THE SAME

The invention herein described was made in the course of or under a contract or subcontract thereunder, (or grant) with the United States Navy.

BACKGROUND OF THE INVENTION

1. Field of the Invention

This invention relates to a high energy oxidizer and a method of producing the same. The composition of the present invention is particularly useful for applications, such as solid propellants and $NF_3$-$F_2$ gas generators.

2. Description of the Prior Art

For oxygen-containing oxidizers, the combination of an oxidizing cation with an oxidizing anion in the form of a stable solid has previously been achieved, as demonstrated by the well known existence of nitronium perchlorate $NO_2^+ClO_4^-$. Whereas fluorine compounds are generally stronger oxidizers than the corresponding oxygen compounds, the synthesis of very powerful, solid, ionic, fluorine containing oxidizers had previously not been possible owing to the incompatibility between energetic anions and the cations. Attempts to combine oxidizing highly fluorinated cations and anions had always resulted in decomposition, accompanied by elimination of elemental fluorine. Consequently, all the previously known solid highly fluorinated oxidizers consisted of the combination of an energetic ion with an non-energetic counter ion. The only progress made in this area consisted of minimizing the relative weight of the non-energetic counter ion. Obviously, the performance of such oxidizers could be significantly improved if the combination of an energetic anion with an energetic cation in the form of a stable solid were possible.

BRIEF SUMMARY AND OBJECTS OF THE INVENTION

The above-described problem of preparing fluorine containing high energy solid oxidizers is overcome by the present invention. We have found two highly energetic ions which can be combined to form a stable ionic solid. These ions are the $NF_4^+$ cation and the $NiF_6^{--}$ anion, and the resulting stable solid is the powerful oxidizer $(NF_4)_2NiF_6$. The oxidizing power of the $NF_4^+$ cation is well established. The oxidizing power of the $NiF_6^{--}$ anion is due to the fact that the parent compound $NiF_4$ is unstable and decomposes to $NiF_2$ and $F_2$. Thus, the thermal decomposition of $(NF_4)_2NiF_6$ proceeds according to:

$$(NF_4)_2NiF_6 \xrightarrow{\Delta T} 2NF_3 + 3F_2 + NiF_2$$

This high oxidizing power of $(NF_4)_2NiF_6$ renders it extremely useful for high energy solid propellant formulations. Of particular interest is its application to solid propellant $NF_3$-$F_2$ gas generators for chemical HF-DF lasers. For the latter application, $(NF_4)_2NiF_6$ possesses, in addition to an energetic counter ion, the desirable properties of being self-clinkering, and of containing a multiply charged counter ion, as disclosed in our copending application Ser. No. 731,197, filed Oct. 12, 1976. Consequently, it is not surprising that its theoretical performance in an $NF_3$-$F_2$ gas generator is superior to those of the best previously known systems, as becomes obvious from an inspection of Table I.

TABLE I

A Comparison of the Theoretical Performance of Various $NF_4^+$ Based $NF_3$—$F_2$ Gas Generator Ingredients

| System | Performance (weight % usable F) |
|---|---|
| $NF_4SbF_6 \cdot 1.2KF$ | 24.0 |
| $NF_4BF_4 \cdot 1.2KF$ | 38.5 |
| $(NF_4)_2SnF_6$ | 46.0 |
| $(NF_4)_2TiF_6$ | 55.6 |
| $(NF_4)_2NiF_6$ | 64.6 |

Since $NiF_4$ is only stable in the form of its $NiF_6^{--}$ anion, the $(NF_4)_2NiF_6$ salt cannot be prepared directly from $NF_3$, $F_2$, and $NiF_4$, but was prepared by the following indirect synthesis in anhydrous HF solution:

$$2NF_4SbF_6 + Cs_2NiF_6 \xrightarrow{\text{HF solution}} 2CsSbF_6\downarrow + (NF_4)_2NiF_6$$

It resulted in the precipitation of the rather insoluble salt $CsSbF_6$, while the soluble $(NF_4)_2NiF_6$ remained in solution. The two products were separated by a simple filtration step. The composition of the crude product was: (mol %) $(NF_4)_2NiF_6$, 81.7; $NF_4SbF_6$, 14.4; $CsSbF_6$, 3.9. The purity of this product can be easily increased by following the procedures outlined for $NF_4BF_4$ in our copending application Ser. No. 731,198, filed Oct. 12, 1976.

Accordingly, it is an object of the present invention to provide an improved fluorine containing high energy oxidizer derived from the combination of an energetic cation with an energetic anion in the form of a stable solid.

Another object of the present invention is to provide an improved high energy oxidizer for solid propellants.

Another object of the present invention is to provide an improved solid propellant $NF_3$—$F_2$ gas generator for chemical HF-DF lasers.

Another object of the present invention is to provide a novel composition of a matter consisting of $(NF_4)_2NiF_6$.

Another object of the present invention is to provide a process for the production of $(NF_4)_2NiF_6$.

These and other objects and features of the present invention will be apparent from the following example. It is understood, however, that this example is merely illustrative of the invention and should not be considered as limiting the invention in any sense. For example, the oxidizing anion is not limited to $NiF_6^{--}$, but could be replaced by other suitable energetic transition metal fluoride anions.

EXAMPLE

In a typical example, $Cs_2NiF_6$ (13.45 mmol) and $NF_4SbF_6$ (27.9 mmol) were combined in a Teflon FEP U-trap containing a magnetic stirrer. The U-trap was closed off on one side by a valve and was connected on the other side through a Teflon filter containing union to a second U-trap. Anhydrous HF (10 ml liquid) was added to the first U-trap and the resulting mixture was stirred for 30 minutes at 25° C. The trap was cooled to −78° C and its contents were passed through the filter. The solid retained by the filter consisted of 10.0 g of $CsSbF_6$ (weight calcd for 27 mmol of $CsSbF_6$ = 9.95 g), whereas the solid (4.4 g) obtained after evaporation of the HF from the filtrate consisted of a mixture (mol %) of $(NF_4)_2NiF_6$ (81.7), $NF_4SbF_6$ (14.4), and $CsSbF_6$ (3.9). The composition of the product was established by chemical analyses for $NF_3$, Ni, Cs, and Sb. The ionic nature of the adduct was established by infrared spectroscopy which showed the strong bands at 1157 and 607 cm$^{-1}$, characteristic for $NF_4^+$, and a strong band at 640 cm$^{-1}$, characteristic for $NiF_6^{--}$. The $(NF_4)_2NiF_6$ salt is a dark red, crystalline, hygroscopic solid which is stable at room temperature.

Obviously, numerous variations and modifications may be made without departing from the present invention. Accordingly, it should be clearly understood that the forms of the present invention described above are illustrative only and are not intended to limit the scope of the present invention.

I claim:

1. An improved, high energy, fluorine containing oxidizer consisting of a compound having $NiF_6^{--}$ as an anion, and an energetic cation.
2. The compound $(NF_4)_2NiF_6$.
3. An improved solid propellant $NF_3-F_2$ gas generator compound consisting of $(NF_4)_2NiF_6$.
4. A process for the production of $(NF_4)_2NiF_6$, comprising the steps of combining $Cs_2NiF_6$ and $NF_4SbF_6$ in a mol ratio of 1:2.0–2.30 in anhydrous HF and removing the $CsSbF_6$ precipitate by filtration at $-78°$ C.

* * * * *